US011141937B2

(12) United States Patent
Boroughs et al.

(10) Patent No.: US 11,141,937 B2
(45) Date of Patent: Oct. 12, 2021

(54) TAPE LAMINATION HEAD WITH TAPE TENSION CONTROL SYSTEM

(71) Applicant: Fives Machining Systems, Inc., Fond du Lac, WI (US)

(72) Inventors: Nicholas Boroughs, Seattle, WA (US); Duncan Kochhar-Lindgren, Seattle, WA (US); Cody Casteneda, Kent, WA (US); Nicholas Gacek, Seatec, WA (US); Amanda Kotchon, Seattle, WA (US)

(73) Assignee: FIVES MACHINING SYSTEMS, INC., Fond du Lac, WI (US)

( * ) Notice: Subject to any disclaimer, the term of this patent is extended or adjusted under 35 U.S.C. 154(b) by 0 days.

(21) Appl. No.: 17/029,283

(22) Filed: Sep. 23, 2020

(65) Prior Publication Data

US 2021/0245452 A1 Aug. 12, 2021

Related U.S. Application Data

(60) Provisional application No. 62/971,052, filed on Feb. 6, 2020.

(51) Int. Cl.
*B29C 70/38* (2006.01)
*B65H 23/185* (2006.01)
(Continued)

(52) U.S. Cl.
CPC ......... *B29C 70/388* (2013.01); *B65H 23/044* (2013.01); *B32B 38/10* (2013.01);
(Continued)

(58) Field of Classification Search
CPC .. B29C 70/388; B65H 23/044; B65H 23/048; B65H 23/063; B65H 23/105; B65H 23/1825
See application file for complete search history.

(56) References Cited

U.S. PATENT DOCUMENTS 4,337,659 A 7/1982 Ragle
4,997,120 A * 3/1991 Tanaka ............... B65H 23/1888
226/25
(Continued)

FOREIGN PATENT DOCUMENTS

CN 103737945 A 4/2014
EP 2495093 B1 4/2015
JP 2002114420 A 4/2002

OTHER PUBLICATIONS

International Search Report for International Application No. PCT/US2020/052102 dated Jan. 8, 2021 (4 pages).
(Continued)

*Primary Examiner* — Scott W Dodds
(74) *Attorney, Agent, or Firm* — Reising Ethington P.C.

(57) ABSTRACT

A tape lamination head for applying composite tape onto a mold or mandrel amid the formation of a composite workpiece. The tape lamination head is but one component of a larger tape lamination machine and assembly. Among its components, the tape lamination head includes a tape supply reel, a backing paper take-up reel, and a tape tension control system. The tape tension control system has a first dancer roller assembly located downstream of the tape supply reel and has a second dancer roller assembly located upstream of the backing paper take-up reel. The first dancer roller assembly can include a first roller, a first guide, a first actuator, a first lock, and a first position sensor. The second dancer roller assembly can include a second roller, a second guide, a second actuator, a second lock, and a second position sensor.

18 Claims, 4 Drawing Sheets

(51) Int. Cl.
*B65H 23/04* (2006.01)
*B65H 23/00* (2006.01)
*B65H 23/06* (2006.01)
*B65H 16/10* (2006.01)
*B32B 38/10* (2006.01)

(52) U.S. Cl.
CPC .......... *B65H 16/103* (2013.01); *B65H 23/005* (2013.01); *B65H 23/048* (2013.01); *B65H 23/063* (2013.01)

(56) References Cited

U.S. PATENT DOCUMENTS

| | | | |
|---|---|---|---|
| 5,032,211 A * | 7/1991 | Shinno | B29C 70/386 156/361 |
| 5,041,179 A * | 8/1991 | Shinno | B29C 70/386 156/64 |
| 5,110,395 A | 5/1992 | Vaniglia | |
| 5,273,614 A | 12/1993 | Grimshaw et al. | |
| 5,290,389 A | 3/1994 | Shupe et al. | |
| 5,698,066 A | 12/1997 | Johnson et al. | |
| 5,979,531 A | 11/1999 | Barr et al. | |
| 8,438,825 B2 | 5/2013 | Beraud et al. | |
| 8,954,180 B2 | 2/2015 | Oldani | |
| 9,149,949 B2 | 10/2015 | Johnson et al. | |
| 9,314,974 B2 | 4/2016 | Buttrick et al. | |
| 9,315,007 B2 | 4/2016 | Vaniglia | |
| 9,694,546 B2 | 7/2017 | Kisch | |
| 9,782,937 B1 | 10/2017 | Modin et al. | |
| 10,112,348 B2 | 10/2018 | Oldani | |
| 2007/0209753 A1 | 9/2007 | Gonzalez et al. | |
| 2010/0276087 A1 | 11/2010 | Weinman et al. | |
| 2011/0114265 A1 | 5/2011 | Hagman et al. | |
| 2013/0111725 A1 | 5/2013 | Torres Martinez | |
| 2013/0186557 A1 * | 7/2013 | Cramer | B32B 5/12 156/256 |
| 2014/0238612 A1 | 8/2014 | Vaniglia et al. | |
| 2014/0305580 A1 | 10/2014 | Hagman et al. | |
| 2018/0361688 A1 | 12/2018 | Kaiser et al. | |
| 2019/0061288 A1 | 2/2019 | Wulfsberg et al. | |
| 2019/0077094 A1 | 3/2019 | Hamlyn et al. | |

OTHER PUBLICATIONS

Written Opinion for International Application No. PCT/US2020/052102 dated Jan. 8, 2021 (9 pages).
International Search Report for International Application No. PCT/US2020/037223 dated Sep. 28, 2020 (3 pages).
Written Opinion for International Application No. PCT/US2020/037223 dated Sep. 28, 2020 (4 pages).

* cited by examiner

TAPE LAMINATION HEAD WITH TAPE TENSION CONTROL SYSTEM

CROSS-REFERENCE To RELATED PATENT APPLICATION

This is a U.S. Non-provisional patent application claiming the benefit of priority from U.S. Provisional patent application No. 62/971,052 filed on Feb. 6, 2020, the entire contents of which are incorporated herein.

TECHNICAL FIELD

The present application relates to tape lamination machines and, more particularly, to tape lamination heads equipped in tape lamination machines for applying composite tape on molds or mandrels amid the formation of composite workpieces.

BACKGROUND

Tape lamination machines are used in the production of composite workpieces. The machines are employed in aerospace applications for aerospace parts, as well as in other applications for other parts. Composite material, in the form of fibrous material impregnated with resin, is applied by the machines to a mold or mandrel at precise locations and lengths to collectively form a composite workpiece. The tape lamination machine moves a tape lamination head over the mold to precisely apply composite tape in the ultimate shape of the composite workpiece. As the tape lamination head moves, it leaves a plurality of composite tape segments, also referred to as a course, behind on the mold. The automatic application of these composite tape segments to the mold involves the cooperation of a diverse collection of machinery that holds, moves, and ultimately cuts the composite tape.

A conventional tape lamination head includes, among its many other components, a tape supply reel and a backing paper take-up reel. Servomotors can drive rotation of both the tape supply reel and the backing paper take-up reel. Composite tape coming from the tape supply reel typically travels through the tape lamination head over multiple rollers prior to its application on the underlying mold. Tension and tautness in the composite tape on its route through the tape lamination head can be maintained, in part, by the driven tape supply and backing paper take-up reels and by being pulled as a result of the application procedure itself. The tension in past tape lamination heads is, in general, maintained at the same level at all times amid the application procedure, including at the start of a tape course, at an end of the tape course, as well as in-between.

SUMMARY

In one implementation, a tape lamination head may include a tape supply reel, a backing paper take-up reel, and a tape tension control system. The tape supply reel is driven for rotational movement by way of a first servomotor. The backing paper take-up reel is driven for rotational movement by way of a second servomotor. The tape tension control system may include a first dancer roller assembly and a second dancer roller assembly. The first dancer roller assembly is located downstream of the tape supply reel. The first dancer roller assembly may include a first roller, a first guide, a first actuator, and a first position sensor. The first roller is carried by the first guide and is moveable on the first guide by way of the first actuator. The first position sensor detects the position of the first roller on the first guide. The second dancer roller assembly is located downstream of the backing paper take-up reel. The second dancer roller assembly may include a second roller, a second guide, a second actuator, and a second position sensor. The second roller is carried by the second guide and is moveable on the second guide by way of the second actuator. The second position sensor detects the position of the second roller on the second guide. In a mode of operation, rotational velocity of the tape supply reel is adjusted via the first servomotor. The adjustment of rotational velocity is based on detected positions of the first roller on the first guide via the first position sensor.

In another implementation, a tape lamination head may include a tape supply reel, a backing paper take-up reel, and a tape tension control system. The tape supply reel is driven for rotational movement by way of a first servomotor. The backing paper take-up reel is driven for rotational movement by way of a second servomotor. The tape tension control system may include a first dancer roller assembly and a second dancer roller assembly. The first dancer roller assembly is located downstream of the tape supply reel. The first dancer roller assembly may include a first roller, a first guide, a first actuator, a first lock, and a first position sensor. The first roller is carried by the first guide and is moveable on the first guide by way of the first actuator. Movement of the first roller on the first guide can be locked by way of the first lock. The first position sensor detects the position of the first roller on the first guide. The second dancer roller assembly is located downstream of the backing paper take-up reel. The second dancer roller assembly may include a second roller, a second guide, a second actuator, a second lock, and a second position sensor. The second roller is carried by the second guide and is moveable on the second guide by way of the second actuator. Movement of the second roller on the second guide can be locked by way of the second lock. The second position sensor detects the position of the second roller on the second guide. In a mode of operation, the first lock is set in an unlocked state. The first roller is moved to a first location on the first guide by way of the first actuator. The tape tension control system seeks to maintain the first roller at the first location based upon detected positions of the first roller on the first guide via the first position sensor. And the tape tension control system seeks to maintain the first roller at the first location by adjusting rotational velocity of the tape supply reel via the first servomotor.

In yet another implementation, a tape lamination head tape tension control system may include a dancer roller assembly. The dancer roller assembly is located near a tape lamination reel. The dancer roller assembly may include a roller, a guide, a pneumatic cylinder actuator, a lock, and a position sensor. The guide carries the roller in a moveable manner. The pneumatic cylinder actuator moves the roller on the guide, as commanded. The lock serves to lock movement of the roller on the guide. The position sensor detects the position of the roller on the guide. In a mode of operation, the lock is set in an unlocked state. The roller is moved to a predetermined location on the guide by way of the pneumatic cylinder actuator. The predetermined location of the roller on the guide is generally maintained based upon detected positions of the roller on the guide via the position sensor, and by adjustments to rotational velocity of the tape lamination reel. Further, in the mode of operation, the maintained predetermined location of the roller on the guide can yield to rapid increases in tension experienced at a tape web via the pneumatic cylinder actuator and via movement of the roller on the guide from the maintained predetermined location.

DETAILED DESCRIPTION

The figures present an embodiment of a tape lamination head 10 that is equipped in a larger tape lamination machine and assembly 12. Unlike past tape lamination heads, the tape lamination head 10 has a tape tension control system 14 that can take-in and absorb sharp increases in tape web tension without the tape web itself substantially experiencing the sharp increases. The tape tension control system 14, in a sense, provides a buffering effect at the tape web. Such sharp increases are often encountered at rapid accelerations of the tape lamination head 10 during its tape application procedure, at jerks, and possibly at other times. Because the tape tension control system 14 spares the tape web of the increased tension, unwanted occurrences of backing paper breakage, bridging, delamination, and/or other consequences are minimized or altogether precluded. The tape lamination head 10, owing to the tape tension control system 14, can therefore perform at higher speeds and greater accelerations amid tape cutting functions and amid advancing and retracting its compactor, for instance, than previously possible. Furthermore, as used herein, the terms downstream and upstream are used with respect to the direction of composite tape movement at the tape lamination head such that downstream refers to a direction that is with the direction of movement and upstream refers to a direction that is against the direction of movement.

Figure 1:
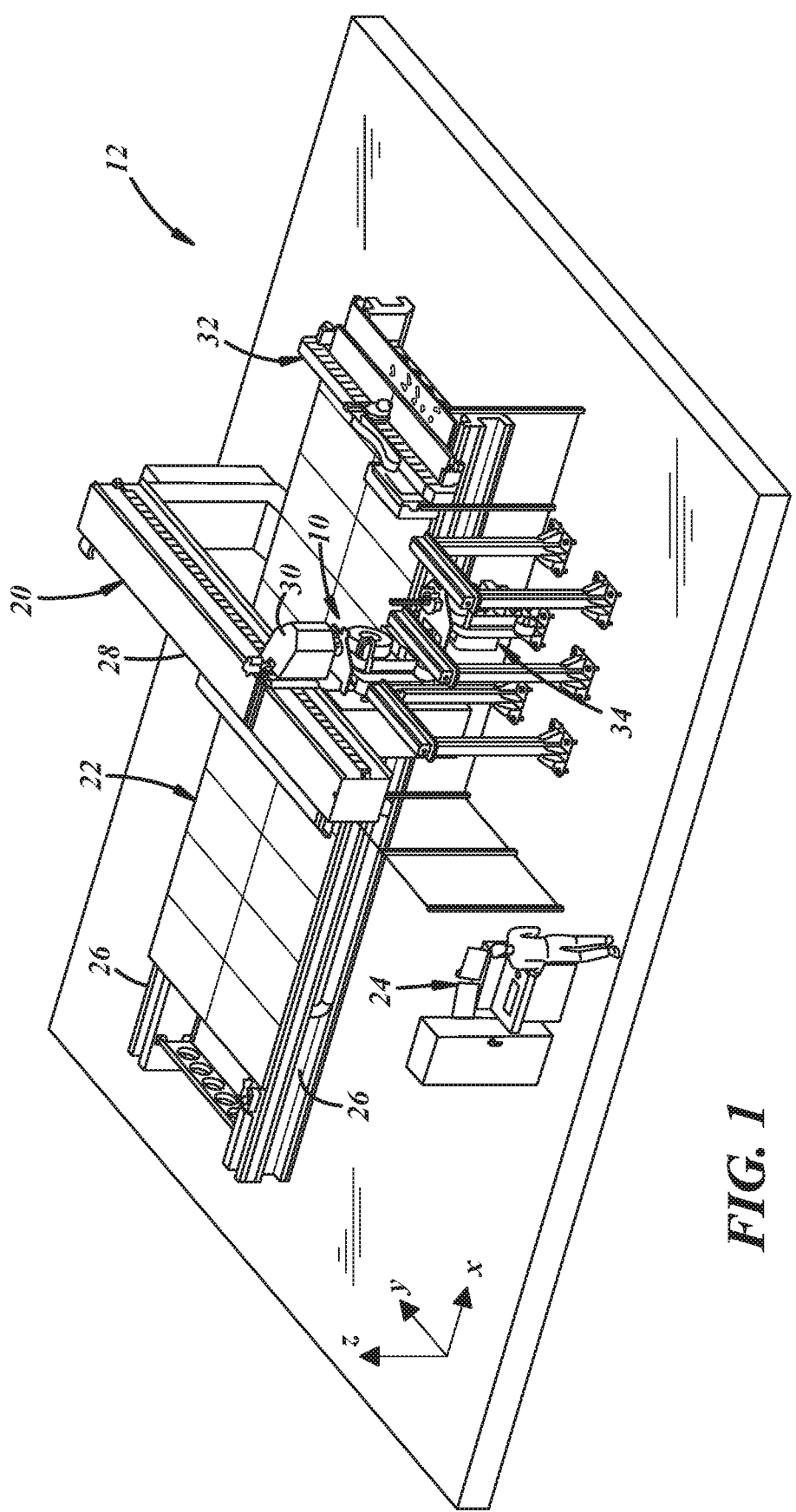
FIG. 1 is a perspective view depicting an implementation of a tape lamination machine and assembly.

With reference to FIG. 1, the tape lamination machine and assembly 12 is used to prepare composite workpieces by applying composite tape 16 to molds. The aerospace industry employs the machines and assemblies for aerospace workpieces such as long narrow flat parts, nested multi-part laminates, drape-formed skins, spars, stringers, beams, flaps, shear ties, ply packs, wing and tail skins, and many other parts. Still, the machines and assemblies are suitable for use in other industries and for other parts. The tape lamination machine and assembly 12 can have various layouts, setups, and equipment depending upon the particular application and particular part it is used to prepare. In the implementation of FIG. 1, the tape lamination machine and assembly 12 generally includes a gantry 20, a vacuum table 22, and an operator station 24. The tape lamination head 10 is docked to the gantry 20, and the gantry 20 provides certain movements of the tape lamination head 10 during the application of the composite tape 16. X-axis movement is carried out via a pair of longitudinal ways 26 and, by way of example, can be effected by rack and pinion drive units. Y-axis movement is carried out via a cross saddle 28 and, by way of example, can be effected by a linear motor and permanent magnets. Z-axis movement is carried out via a vertical slide 30 and, by way of example, can be effected by a precision ball screw actuator with a gearbox and a servo motor. The vertical slide 30 can also provide C-axis rotational movement which, by way of example, can be effected by a servo motor and a gearbox. Still, the tape lamination head 10 can be carried by other equipment and its movement can be provided in other ways; for example, the tape lamination head 10 could be mounted to a robotic arm that manipulates its movement in a different manner than described above.

Still referring to FIG. 1, the vacuum table 22 holds the mold (not shown) while the mold undergoes application of the composite tape 16 from the tape lamination head 10. The operator station 24 can serve as a human-to-machine interface (HMI) site and permits certain operator controls and management of the tape lamination machine and assembly 12. Furthermore, and as shown in FIG. 1, the tape lamination machine and assembly 12 can include an auxiliary gantry 32 with trimming capabilities for parts, and can include a secondary tape lamination head and exchange station 34 for replacing tape lamination heads at the gantry 20 in need of composite tape supply or for other reasons. While shown and described with these layouts, setups, and equipment, the tape lamination machine and assembly 12 can have more, less, and/or different layouts, setups, and/or equipment in other implementations.

The precise nature of the composite tape 16 laid down by the tape lamination head 10 will depend on the particular application and part. In the aerospace example, the composite tape 16 can be in the form of a unidirectional carbon fiber tape impregnated with thermoset or thermoplastic resin and having a carrier or backing paper 36 on one of the two sides of the composite tape 16. The edge-to-edge width of the composite tape 16 can vary—again depending on application and part—and in the aerospace example could be fifty millimeters (50 mm), seventy-five millimeters (75 mm), one hundred and fifty millimeters (150 mm), or three hundred millimeters (300 mm); still, other width dimensions are possible. Prior to its loading in the tape lamination head 10, the composite tape 16 is wound on a tape supply spool 38 in an arrangement with a sticky or tacky side 40 of the composite tape 16 facing radially-outwardly and with a backing paper side 42 of the composite tape 16 facing radially-inwardly.

The tape lamination head 10 can have various designs, constructions, and components depending upon the particular application it is intended for use with and the particular parts it is intended to prepare. In the embodiment of FIGS. 2-5, the tape lamination head 10 generally includes a frame 44, a coupler 46, a tape supply reel 48, a set of rollers 50, a cutter 52, a scrap collector 54, a backing paper removal assembly 56, a compactor 58, and the tape tension control system 14. Still, in other embodiments the tape lamination head 10 can have more, less, and/or different components than those set forth here.

Figure 2:
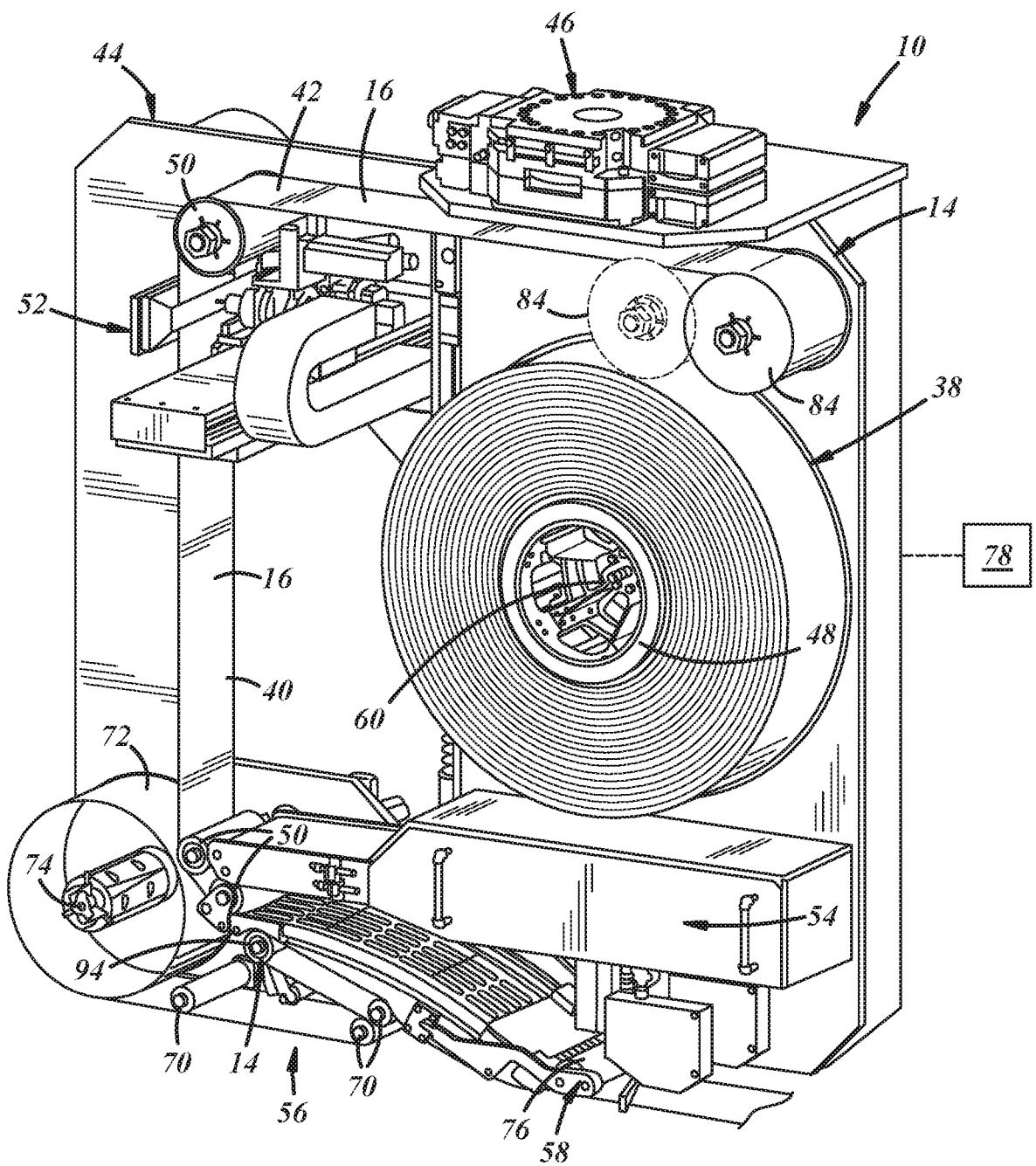
FIG. 2 is a perspective view depicting an implementation of a tape lamination head that can be equipped in the tape lamination machine and assembly.
Figure 3:
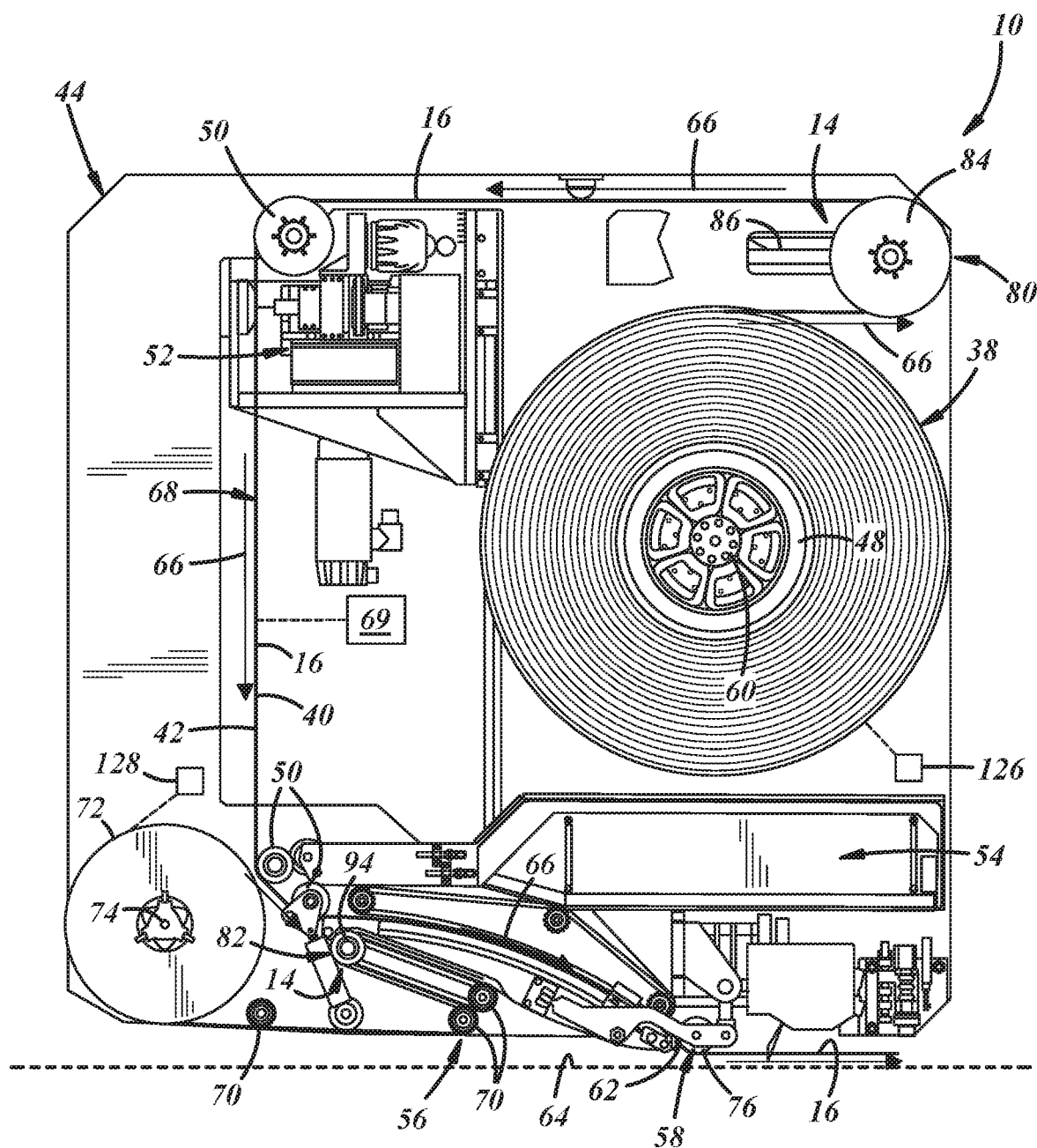
FIG. 3 is a side view of the tape lamination head demonstrating a composite tape path.

With particular reference to FIGS. 2 and 3, the frame 44 serves as the main structure of the tape lamination head 10 to which other components are mounted and about which other components are arranged. The frame 44 could form an enclosed housing, or can be an open-sided structure as illustrated in the figures. The coupler 46 provides a docking interface for attachment and detachment of the tape lamination head 10 to and from the gantry 20. The tape supply reel 48 receives the tape supply spool 38 for loading the tape supply spool 38 and its wound composite tape 16 in the tape lamination head 10. The tape supply reel 48 is driven for rotational movement via a first servomotor 60 in order to unwind composite tape 16 from the tape supply spool 38 and feed the composite tape 16 through the tape lamination head 10 for downstream usage. The first servomotor 60 can be paired with a rotary encoder. The rollers 50 assist with carrying the composite tape 16 from the tape supply spool 38 and downstream of the tape supply reel 48. The composite tape 16 is, in general, routed internally through the tape lamination head 10 to an exit 62 (FIG. 3) via the rollers 50 for application to a layup surface 64 of the underlying mold. Along the way, the composite tape 16 can be carried and supported by other components apart from the rollers 50. The cutter 52 severs the composite tape 16 during use of the tape lamination head 10 in order to produce terminal ends of composite tape segments as needed for the particular mold and for terminating a composite tape course. The scrap collector 54 gathers scrap pieces of the composite tape 16 resulting from cutting of the composite tape 16. The scrap collector 54 can include a bin for containing the scrap pieces.

Routing of the composite tape 16 through the tape lamination head 10 is generally set by the location of the rollers 50 and defines a composite tape path 66. The composite tape 16 held taut along the composite tape path 64 constitutes a tape web 68 of the tape lamination head 10. The composite tape path 66 is schematically represented in FIG. 3 by numerous arrowed lines residing alongside the composite tape 16 along its taut extent from the tape supply spool 38, over the rollers 50, and to the exit 62. In the embodiment of FIG. 3, the composite tape path 66 routes the composite tape 16 in a manner which is reverse that of past tape lamination heads. The reversal works to bring the backing paper side 42 of the composite tape 16 to a facedown orientation and confrontation with the layup surface 64. Still, in other embodiments the composite tape path 66 could have a more conventional route through the tape lamination head 10 and need not exhibit the reversal routing presented in the figures. Furthermore, a tape web sensor or encoder 69 can be provided in the tape lamination head 10 in order to sense and provide an indication of the position of the tape web 68 as the composite tape 16 is routed through the tape lamination head 10. The tape web encoder 69 can be employed in certain modes of operation of the tape lamination head 10, and can be in the form of a rotary encoder.

Figure 4:
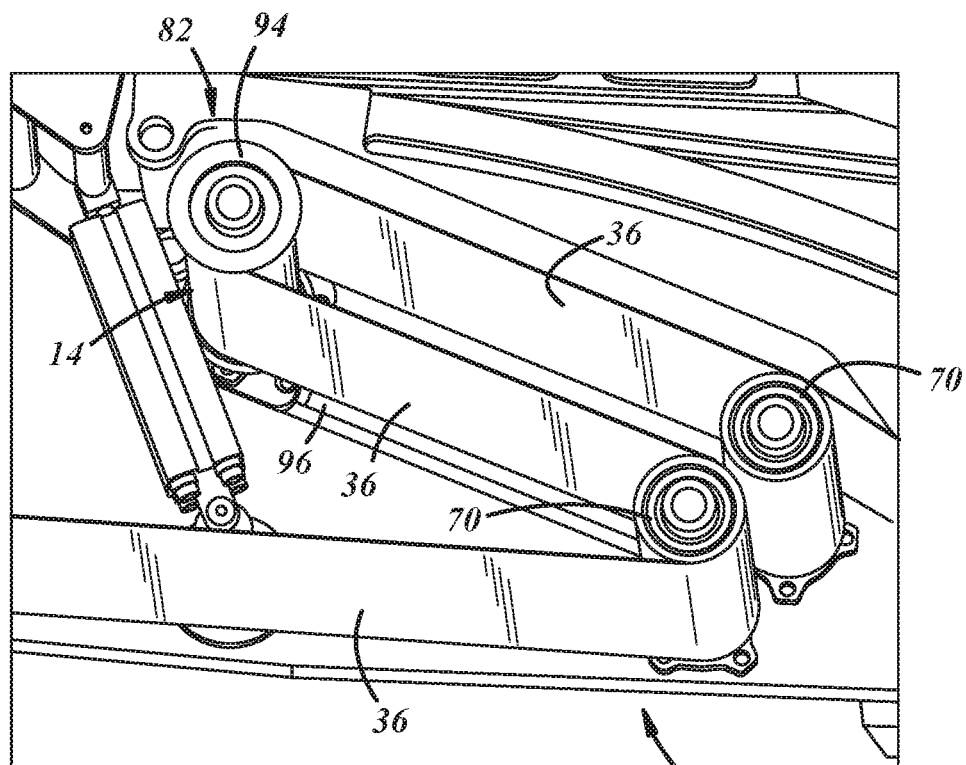
FIG. 4 is an enlarged view of a region of the tape lamination head illustrating a backing paper path after its removal from composite tape.

The backing paper removal assembly 56 separates and peels the backing paper 36 from the tape main body of the composite tape 16. Referring now to FIG. 4, the separation occurs downstream of the rollers 50 and occurs upstream of the exit 62 and upstream of the compactor 58. In the embodiment of FIGS. 2-4, the backing paper removal assembly 56 includes a set of rollers 70 and a backing paper take-up reel 72. The rollers 70 assist with carrying the backing paper 36 once the backing paper 36 is separated from the tape main body. The backing paper take-up reel 72 accumulates the backing paper 36 and winds the backing paper 36 fed to it downstream of the rollers 70. The backing paper take-up reel 72 is driven for rotational movement via a second servomotor 74 in order to take-up the peeled-off backing paper 36. The second servomotor 74 can be paired with a rotary encoder.

The compactor 58 exerts compaction pressure and load to the tape main body of the composite tape 16 as the tape main body is being applied to the layup surface 64. In this embodiment, and referring to FIGS. 2 and 3, the compactor 58 is in the form of a compaction roller 76. The compaction roller 76 is mounted at or near the exit 62 so that the compaction roller 76 can come into abutment with the tape main body as the tape main body is dispensed through the exit 62. In the example of the figures, the compaction roller 76 is a single, soft polyurethane compaction roller.

Furthermore, an electronic control unit (ECU) 78 (FIG. 2) is provided for the tape lamination head 10 in order to perform certain operations and to manage one or more electrical systems and/or one or more electrical subsystems of the tape lamination head 10. As an example, the ECU 78 can command and control the rotational velocity of the first and second servomotors 60, 74, and can communicate with sensors of the tape lamination head 10 such as the tape web encoder 69, and can communicate with sensors of the tape tension control system 14, some of which are noted below.

The tape tension control system 14 serves to impart and maintain tension and tautness in the tape web 68 as the composite tape 16 travels through the tape lamination head 10. The tape tension control system 14 is able to absorb sharp spikes in tension that would otherwise be experienced more directly by the tape web 68 and that, when experienced, could cause backing paper breakage, bridging, delamination, and/or other unwanted consequences. The unwanted consequences are minimized or altogether precluded with the use of the tape tension control system 14. The tape tension control system 14 can have various designs, constructions, and components in different embodiments. In the embodiment of the figures, and referring now to FIGS. 3-5, the tape tension control system 14 is a two-dancer control system and includes a first dancer roller assembly 80 and a second dancer roller assembly 82. The first dancer roller assembly 80 resides immediately downstream of the tape supply reel 48 and initially accepts engagement from the composite tape 16 as the composite tape 16 comes off of the tape supply spool 38. The second dancer roller assembly 82, on the other hand, resides upstream of the backing paper take-up reel 72 and accepts engagement from the backing paper 36 as the backing paper 36 is pulled from the tape main body via the backing paper removal assembly 56 and fed to the backing paper take-up reel 72.

Figure 5:
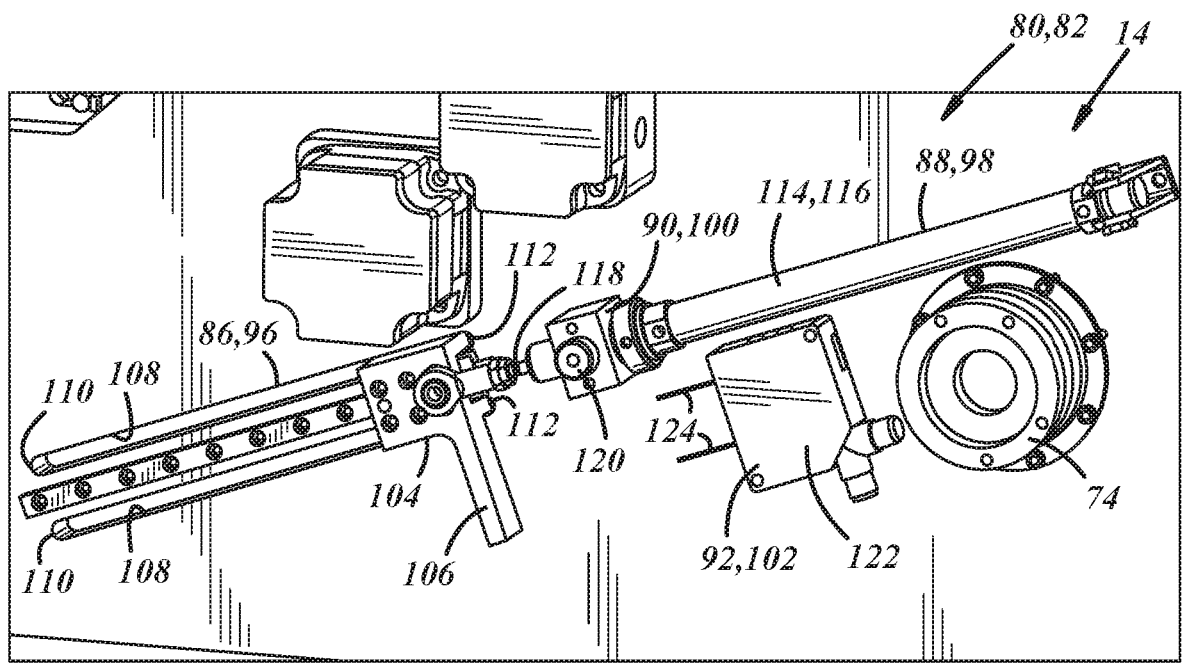
FIG. 5 is a perspective view of an embodiment of a tape tension control system.

As with the tape tension control system 14, the first and second dancer roller assemblies 80, 82 can have various designs, constructions, and components in different embodiments. One embodiment is presented in FIG. 5. FIG. 5 depicts an opposite side view of the tape lamination head 10 than that depicted in FIG. 3, and it particularly shows an enlarged region with the second dancer roller assembly 82. Since the first and second dancer roller assemblies 80, 82 have corresponding components, reference is made to FIG. 5 for this description of both of the first and second dancer roller assemblies 80, 82. The first dancer roller assembly 80 includes a first roller 84, a first guide 86, a first actuator 88, a first lock 90, and a first position sensor 92. Similarly, the second dancer roller assembly 82 includes a second roller 94, a second guide 96, a second actuator 98, a second lock 100, and a second position sensor 102. Still, in other embodiments, the first and second dancer roller assemblies 80, 82 could have more, less, and/or different components than those set forth here, and need not necessarily have the same components.

The roller 84, 94 is carried by the guide 86, 96 and can move back and forth across the guide 86, 96 in response to prompting by the actuator 88, 98. The rollers 84, 94 are free to spin as the respective composite tape 16 and backing paper 36 travel over them amid use of the tape lamination head 10. At a backside of the roller 84, 94, a carriage 104 assists with piloting the roller 84, 94 along the guide 86, 96. Each roller 84, 94 is coupled to a dedicated carriage 104. The carriage 104 can slide along the guide 86, 96 and—due to its coupling with the roller 84, 94—conveys the roller 84, 94 along the guide 86, 96. In this embodiment, the carriage 104 has an extension 106 for interaction with the position sensor 92, 102. In the example of the position sensor 92, 102 being in the form of a laser distance feedback sensor, the extension 106 serves as a target for the accompanying emitted laser. The guide 86, 96 is defined by a pair of slots 108 that span linearly between a first terminal end 110 and a second terminal end 112. Movement of the roller 84, 94 along the guide 86, 96 is hence linear and reciprocating in nature—the roller 84, 94 moves forward in one direction and backward in the opposite direction over the guide 86, 96.

The actuator 88, 98 is activated in order to incite movement of the roller 84, 94 along the guide 86, 96. The actuator 88, 98 and roller 84, 94 are coupled together. The actuator 88, 98 can take different forms in different embodiments. In the embodiment of the figures, the actuator 88, 98 is in the form of a pneumatic cylinder actuator 114, 116 and, in particular, a double-acting pneumatic cylinder actuator that employs the force of air for its extension and retraction strokes and movements. Here, a rod 118 of the pneumatic cylinder actuator 114, 116 is connected to the carriage 104 so that extension and retraction movements of the rod 118 cause forward and backward movements of the roller 84, 94. The lock 90, 100 halts and holds movement of the roller 84, 94 in position on the guide 86, 96. In this embodiment, the lock 90, 100 is in the form of a rod lock 120 that is incorporated with the rod 118. Furthermore, the position sensor 92, 102 detects the position of the roller 84, 94 on the guide 86, 96 and can communicate its output to the ECU 78. In this embodiment, the position sensor 92, 102 is in the form of a laser distance feedback sensor 122 that emits laser beams 124 that are intended to strike the extension 106.

Lastly, the tape tension control system 14 can include a third position sensor 126 and a fourth position sensor 128. The third position sensor 126 and the fourth position sensor 128 are depicted schematically in FIG. 3. The third position sensor 126 provides an indication of a diameter of the composite tape 16 wound on the tape supply spool 38. The indication can be instantaneous as the composite tape 16 is depleted from the tape supply spool 38 during use. The output of the third position sensor 126 can be communicated to the ECU 78. Similarly, the fourth position sensor 128 provides an indication of a diameter of the backing paper 36 wound on the backing paper take-up reel 72. The indication can be instantaneous as the backing paper 36 is accumulated on the backing paper take-up reel 72 during use. The output of the fourth position sensor 128 can be communicated to the ECU 78.

In use, the tape tension control system 14 can operate under different modes of operation depending on a particular tape application procedure being performed by the tape lamination head 10. For instance, in a first mode of operation, or position mode, the tape lamination head 10 can be carrying out the initiation of a composite tape course on the layup surface 64 or the termination of a composite tape course on the layup surface 64 which involves use of the cutter 52. Still, the first mode of operation can be called for at other times demanding heightened tape application precision. In a second mode of operation, or tension mode, the tape lamination head 10 can be applying a main section of a composite tape course with the composite tape 16 under the exerted compaction pressure of the compactor 58. Application of the main section typically occurs between the initiation and termination of a composite tape course. The tape tension control system 14 can more fluidly shift between the first and second modes of operation during use of the tape lamination head 10 than previously possible. Such shifting can occur on-the-fly and at any time and multiple times amid a particular tape application procedure without a discrete pause in the application procedure at the time of shifting. A more efficient and more effective tape application procedure is hence provided. Whether the tape tension control system 14 operates under the first mode of operation or the second mode of operation is dictated, in part, by the particular scenario encountered during the tape application procedure and whether that scenario can be suitably handled under the first mode of operation or under the second mode of operation.

The tape tension control system 14 can function in different manners in the first and second modes of operation. In the first mode of operation, one of the first or second locks 90, 100 is set in a locked state, while the other of the first or second locks 90, 100 is set in an unlocked state. In a particular example, the first lock 90 is set in its locked state and the second lock 100 is set in its unlocked state. The tape web 68 can be routed a prescribed degree via the first and second servomotors 60, 74, and the tape web encoder 69 can provide an indication of the position of the tape web 68. The ECU 78 can command the rotational movement of the first and second servomotors 60, 74 in response to the indicated position and its comparison to an intended position. The first mode of operation can thereby exhibit closed-loop functionality.

In the second mode of operation, the first lock 90 is set in its unlocked state and the second lock 100 is set in its unlocked state. Due to the unlocked states, the first roller 84 is capable of a certain amount of movement on the first guide 86 and the second roller 94 is capable of a certain amount of movement on the second guide 96. The first actuator 88 is activated to incite movement of the first roller 84 to a first predetermined position and location on the linear extent of the first guide 86. The first predetermined location can be a position on the first guide 86 that provides an extent and clearance between the first roller 84 and the first terminal end 110, and that provides an extent and clearance between the first roller 84 and the second terminal end 112. In an example, the first predetermined location is a first approximate middle location on the first guide 86, or is a mid-stroke of the first pneumatic cylinder actuator 114. The extents and clearances provided on each side of the first roller 84 and at opposite sides of the first guide 86 accommodate movements of the first roller 84 back and forth as rapid increases in tension at the tape web 68 are transmitted to the first roller 84. It is these movements of the first roller 84 and attendant yielding of the first actuator 88 that works to absorb the rapid increases in tension. In the example of the first pneumatic cylinder actuator 114, the yielding is effected by air compression within the first pneumatic cylinder actuator 114. The tape tension control system 14 seeks to maintain the position of the first roller 84 at the first predetermined location amid the second mode of operation. In this embodiment, the first position sensor 92 monitors the position of the first roller 84 on the first guide 86. When the first roller 84 is moved out of position and away from the first predetermined location, the rotational velocity of the tape supply reel 48 can be adjusted, i.e., increased or decreased, via the first servomotor 60 depending on which direction the first roller 84 needs to move on the first guide 86 in order to maintain the first predetermined location.

In a similar way, and concurrent with the actions above, the second actuator 98 is activated to incite movement of the second roller 94 to a second predetermined position and location on the linear extent of the second guide 96. The second predetermined location can be a position on the second guide 96 that provides an extent and clearance between the second roller 94 and the first terminal end 110, and that provides an extent and clearance between the second roller 94 and the second terminal end 112. In an example, the second predetermined location is a second approximate middle location on the second guide 96, or is a mid-stroke of the second pneumatic cylinder actuator 116. The extents and clearances provided on each side of the second roller 94 and at opposite sides of the second guide 96 accommodate movements of the second roller 94 back and forth as rapid increases in tension at the tape web 68 are transmitted to the second roller 94. It is these movements of the second roller 94, coupled with those of the first roller 84, and attendant yielding of the second actuator 98 that works to absorb the rapid increases in tension. In the example of the second pneumatic cylinder actuator 116, the yielding is effected by air compression within the second pneumatic cylinder actuator 116. As before, the tape tension control system 14 seeks to maintain the position of the second roller 94 at the second predetermined location amid the second mode of operation. In this embodiment, the second position sensor 102 monitors the position of the second roller 94 on the second guide 96. When the second roller 94 is moved out of position and away from the second predetermined location, the rotational velocity of the backing paper take-up reel 72 can be adjusted, i.e., increased or decreased, via the second servomotor 74 depending on which direction the second roller 94 needs to move on the second guide 96 in order to maintain the second predetermined location.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A tape lamination head, comprising:
    a tape supply reel driven for rotational movement via a first servomotor;
    a backing paper take-up reel driven for rotational movement via a second servomotor; and
    a tape tension control system, comprising:
        a first dancer roller assembly located downstream of the tape supply reel accepting composite tape carried by the tape supply reel, the first dancer roller assembly comprising a first roller, a first guide, a first actuator, and a first position sensor, the first roller carried by the first guide and moveable on the first guide via the first actuator, and the first position sensor detecting the position of the first roller on the first guide;
        a second dancer roller assembly located upstream of the backing paper take-up reel accepting backing paper pulled from the composite tape carried by the tape supply reel, the second dancer roller assembly comprising a second roller, a second guide, a second actuator, and a second position sensor, the second roller carried by the second guide and moveable on the second guide via the second actuator, and the second position sensor detecting the position of the second roller on the second guide;
        wherein, in one mode of operation, rotational velocity of the tape supply reel is adjusted via the first servomotor based on detected positions of the first roller on the first guide via the first position sensor.

2. The tape lamination head as set forth in claim 1, wherein, in the one mode of operation, rotational velocity of the backing paper take-up reel is adjusted via the second servomotor based on detected positions of the second roller on the second guide via the second position sensor.

3. The tape lamination head as set forth in claim 2, wherein, in the one mode of operation, the first roller is moved to a first location on the first guide between ends of the first guide via the first actuator, the second roller is moved to a second location on the second guide between ends of the second guide via the second actuator, the tape tension control system seeks to maintain the first roller at the first location based on detected positions of the first roller on the first guide via the first position sensor and by adjusting rotational velocity of the tape supply reel via the first servomotor, and the tape tension control system seeks to maintain the second roller at the second location based on detected positions of the second roller on the second guide via the second position sensor and by adjusting rotational velocity of the backing paper take-up reel via the second servomotor.

4. The tape lamination head as set forth in claim 1, wherein the first dancer roller assembly comprises a first lock and movement of the first roller on the first guide is lockable via the first lock, and the second dancer roller assembly comprises a second lock and movement of the second roller on the second guide is lockable via the second lock.

5. The tape lamination head as set forth in claim 4, wherein, in another mode of operation, one of the first lock or the second lock is set in a locked state and movement of the respective first roller or second roller on the respective first guide or second guide is locked, and the other of the first lock or the second lock is set in an unlocked state.

6. The tape lamination head as set forth in claim 5, further comprising a tape web encoder indicating position of a tape web, and wherein, in the another mode of operation, the tape web is moved in the tape lamination head and the tape web encoder indicates positions of the tape web.

7. The tape lamination head as set forth in claim 1, wherein movement of the first roller on the first guide is yieldable to rapid increases in tension experienced at a tape web via the first actuator and via movement of the first roller on the first guide, and wherein movement of the second roller on the second guide is yieldable to rapid increases in tension experienced at the tape web via the second actuator and via movement of the second roller on the second guide.

8. The tape lamination head as set forth in claim 7, wherein the first actuator is a first pneumatic cylinder actuator, and the second actuator is a second pneumatic cylinder actuator.

9. The tape lamination head as set forth in claim 1, wherein the tape tension control system comprises a third position sensor indicating a diameter of composite tape received on the tape supply reel.

10. The tape lamination head as set forth in claim 1, wherein the tape tension control system comprises a fourth position sensor indicating a diameter of backing paper received on the backing paper take-up reel.

11. A tape lamination machine and assembly comprising the tape lamination head of claim 1.

12. A tape lamination head, comprising:
- a tape supply reel driven for rotational movement via a first servomotor;
- a backing paper take-up reel driven for rotational movement via a second servomotor; and
- a tape tension control system, comprising:
  - a first dancer roller assembly located downstream of the tape supply reel accepting composite tape carried by the tape supply reel, the first dancer roller assembly comprising a first roller, a first guide, a first actuator, a first lock, and a first position sensor, the first roller carried by the first guide and moveable on the first guide via the first actuator, movement of the first roller on the first guide lockable via the first lock, and the first position sensor detecting the position of the first roller on the first guide;
  - a second dancer roller assembly located upstream of the backing paper take-up reel accepting backing paper pulled from the composite tape carried by the tape supply reel, the second dancer roller assembly comprising a second roller, a second guide, a second actuator, a second lock, a second position sensor, the second roller carried by the second guide and moveable on the second guide via the second actuator, movement of the second roller on the second guide lockable via the second lock, and the second position sensor detecting the position of the second roller on the second guide;
  - wherein, in one mode of operation, the first lock is set in an unlocked state, the first roller is moved to a first location on the first guide via the first actuator, and the tape tension control system seeks to maintain the first roller at the first location based on detected positions of the first roller on the first guide via the first position sensor and by adjusting rotational velocity of the tape supply reel via the first servomotor.

13. The tape lamination head as set forth in claim 12, wherein, in the one mode of operation, the second lock is set in an unlocked state, the second roller is moved to a second location on the second guide via the second actuator, and the tape tension control system seeks to maintain the second roller at the second location based on detected positions of the second roller on the second guide via the second position sensor and by adjusting rotational velocity of the backing paper take-up reel via the second servomotor.

14. The tape lamination head as set forth in claim 13, wherein the first location is a first approximate middle location on the first guide, and the second location is a second approximate middle location on the second guide.

15. The tape lamination head as set forth in claim 12, wherein, in another mode of operation, one of the first lock or the second lock is set in a locked state and movement of the respective first roller or second roller on the respective first guide or second guide is locked, and the other of the first lock or the second lock is set in an unlocked state.

16. The tape lamination head as set forth in claim 12, wherein movement of the first roller on the first guide is yieldable to rapid increases in tension experienced at a tape web via the first actuator and via movement of the first roller on the first guide.

17. The tape lamination head as set forth in claim 16, wherein movement of the second roller on the second guide is yieldable to rapid increases in tension experienced at the tape web via the second actuator and via movement of the second roller on the second guide.

18. The tape lamination head as set forth in claim 12, wherein the tape tension control system comprises a third position sensor indicating a diameter of composite tape received on the tape supply reel, and the tape tension control system comprises a fourth position sensor indicating a diameter of backing paper received on the backing paper take-up reel.

* * * * *